(12) United States Patent
Kind (10) Patent No.: US 9,745,434 B2
(45) Date of Patent: Aug. 29, 2017

(54) ELASTOMERIC BODY WITH ELASTIC FIRE RETARDANT COATING

(75) Inventor: David Kind, Coalville (GB)

(73) Assignee: TRELLEBORG INDUSTRIAL PRODUCTS UK LTD, Tewkesbury (GB)

( * ) Notice: Subject to any disclaimer, the term of this patent is extended or adjusted under 35 U.S.C. 154(b) by 910 days.

(21) Appl. No.: 12/654,186

(22) Filed: Dec. 14, 2009

(65) Prior Publication Data

US 2010/0183856 A1 Jul. 22, 2010

Related U.S. Application Data

(60) Provisional application No. 61/193,678, filed on Dec. 15, 2008.

(30) Foreign Application Priority Data

Dec. 15, 2008 (EP) .................... 08171642

(51) Int. Cl.
*C09K 21/02* (2006.01)
*B32B 7/02* (2006.01)
(Continued)

(52) U.S. Cl.
CPC ............... *C08J 7/047* (2013.01); *C08J 7/04* (2013.01); *C09D 5/18* (2013.01); *C08J 2321/00* (2013.01); *Y10T 428/24942* (2015.01); *Y10T 428/31511* (2015.04); *Y10T 428/31551* (2015.04); *Y10T 428/31826* (2015.04); *Y10T 428/31931* (2015.04)

(58) Field of Classification Search
USPC ............ 428/212, 688, 413, 521, 492, 423.1; 524/571, 405, 436, 445
See application file for complete search history.

(56) References Cited

U.S. PATENT DOCUMENTS 4,056,161 A * 11/1977 Allen, Jr. ...................... 181/290
4,198,328 A 4/1980 Bertelli et al.
(Continued)

FOREIGN PATENT DOCUMENTS

CN 101003611 7/2007
DE 3625080 1/1988
(Continued)

OTHER PUBLICATIONS

Machine_English_Translation_EP_835900_A2; Breuer, Michael; Elastic Articles; Apr. 15, 1998; EPO; whole document.*
(Continued)

*Primary Examiner* — Tahseen N Khan
(74) *Attorney, Agent, or Firm* — Harness, Dickey & Pierce, P.L.C.

(57) ABSTRACT

An elastomeric body suitable for anti-vibration and suspension is disclosed. The elastic body includes at least one layer of an elastic and flexible fire retardant coating covering at least a portion of the body. The at least one layer of fire retardant coating is non-halogenated and includes a fire retardant substance and an elastic binder material. The fire retardant substance includes expandable graphite. The at least one layer of coating has an elasticity greater than 20%.

14 Claims, 10 Drawing Sheets

(51) Int. Cl.

| | |
|---|---|
| *B32B 25/00* | (2006.01) |
| *C08K 3/04* | (2006.01) |
| *C08K 3/20* | (2006.01) |
| *C08K 3/34* | (2006.01) |
| *C08J 7/04* | (2006.01) |
| *C09D 5/18* | (2006.01) |

(56) References Cited

U.S. PATENT DOCUMENTS

| | | | |
|---|---|---|---|
| 4,207,374 A | 6/1980 | Groff | |
| 4,698,369 A | 10/1987 | Bell | |
| 5,063,012 A | 11/1991 | Gibbon | |
| 5,192,811 A * | 3/1993 | Heitmann | C08K 3/04 521/128 |
| 5,370,733 A | 12/1994 | Gibbon | |
| 5,453,126 A | 9/1995 | Gibbon | |
| 5,760,115 A | 6/1998 | Okisaki et al. | |
| 6,245,842 B1 | 6/2001 | Buxton et al. | |
| 6,851,506 B2 | 2/2005 | Bovio | |
| 6,994,913 B1 * | 2/2006 | Niki | A43B 1/10 428/364 |
| 2001/0029276 A1 | 10/2001 | Ishihara et al. | |
| 2003/0139492 A1 | 7/2003 | Abu-Isa | |
| 2005/0139126 A1 | 6/2005 | Khan et al. | |
| 2006/0008664 A1 | 1/2006 | Wakabayashi et al. | |
| 2006/0079612 A1 * | 4/2006 | Troutman et al. | 524/99 |
| 2006/0211784 A1 | 9/2006 | Veneruso | |
| 2006/0293443 A1 * | 12/2006 | Reinheimer | C08K 3/04 524/589 |
| 2007/0166454 A1 | 7/2007 | Gupta | |
| 2007/0197686 A1 | 8/2007 | Dimanshteyn et al. | |
| 2007/0290542 A1 | 12/2007 | Wada | |

FOREIGN PATENT DOCUMENTS

| | | | |
|---|---|---|---|
| DE | 10 2005 008 786 | | 8/2006 |
| DE | 10-2005-009677 | | 9/2006 |
| EP | 0 835 900 | | 4/1998 |
| EP | 835900 | A2 * | 4/1998 |
| EP | 1-331-242 | | 7/2003 |
| GB | 2007-689 | | 5/1979 |
| JP | 59-58107 | | 4/1984 |
| JP | 02-196837 | | 8/1990 |
| JP | 5-070540 | | 3/1993 |
| JP | 10-017796 | | 1/1998 |
| JP | 11-094002 | | 4/1999 |
| JP | 2001-081226 | | 3/2001 |
| JP | 2001-311049 | A | 11/2001 |
| JP | 2002-105328 | | 4/2002 |
| JP | 2004-307594 | A | 11/2004 |
| JP | 2005-133054 | | 5/2005 |
| JP | 2006-052566 | | 2/2006 |
| JP | 2006-257181 | | 9/2006 |
| RU | 2186813 | | 8/2002 |
| SE | 528436 | | 11/2006 |
| WO | WO 91/11498 | | 8/1991 |
| WO | WO 2006/125258 | | 11/2006 |
| WO | WO 2007/050000 | | 5/2007 |
| WO | WO 2008/141857 | | 11/2008 |

OTHER PUBLICATIONS

Database WPI Week 199538 Thomson Scientific, London, GB; AN 1995-291567 XP002527197 & RU 2 029 157 C1 (Rakhmanov N N) Feb. 20, 1995 (Feb. 20, 1995).

Fabris, H.J., et al., "Flame Retardation of Natural and Synthetic Rubbers," The General Tire & Rubber Company, Akron, Ohio, vol. 2, Chapter 3, selected pages.

Abstract for "Expandable Graphite Provides Intumescent Flame Retardance," Plastics, Additives, & Compounding 4, No. 7-8, Jul.-Aug. 2002, p. 7.

Abstract for Lutter, et al., "Preparation of Flame-Resistant Soft Polyurethane Foams of Reduced Smoke Density, and Melamine/Expandable Graphite/Polyether-Polyol Dispersions for this Purpose."

Abstract for Shi, et al., "Expandable Graphite for Halogen-Free Flame-Retardant of High-Density Rigid Polyurethane Foams," Sichuan, University; China, Engineering Physical Academy, Polymer Plastic Technology and Engineering 44, No. 7, 2005, p. 1323-1337.

Abstract for "Thermal Degradation of Polyurethane and Polyurethane/Expandable Graphite Coatings," Polymer Degradation and Stability 74, No. 3, 2001, p. 493-9.

Fabris, H.J., et al., "Flame Retardation of Natural and Synthetic Rubbers," The General Tire & Rubber Company, Akron, Ohio, vol. 2, Chapter 3, selected pages, 1973.

Notice of Opposition against corresponding European patent application No. EP 2 196 492 dated Mar. 21, 2013 (in English).

First Office Action for corresponding Japanese patent application No. 2011-541339 mailed Jun. 11, 2013 (in English).

Opposition against corresponding European patent application No. EP 2 196 492 dated Mar. 21, 2013 (in German).

Conference article; Rao et al., "Flame Retardant Coatings for Elastomers," Akron Rubber Development Laboratory, Akron, OH, 44305, ISSN: 1547-1977, Paper No. 64.

Abstract for conference article Rao et al., "Flame Retardant Coatings for Elastomers," entry date Oct. 6, 2005.

Response to Notice of Opposition for corresponding European patent application No. EP 2 196 492 dated Jun. 11, 2013.

Momentive™, Technical Data Sheet, EPON™ Resin 815C, Re-issued Sep. 2005, Revised Mar. 14, 2013, pp. 1-3.

Office Action for Corresponding Korean Patent Application No. 10-2011-7016281 issued on Nov. 9, 2015 and English translation thereof.

* cited by examiner

Fig. 9
Rate of Smoke Release (RSR)

ELASTOMERIC BODY WITH ELASTIC FIRE RETARDANT COATING

PRIORITY STATEMENT

The present application hereby claims priority under 35 U.S.C. §119 on EP 08171642.5 filed Dec. 15, 2008 and under 35 U.S.C. §119 (e) on U.S. provisional patent application Ser. No. 61/193,678 filed Dec. 15, 2008, the entire contents of each of which are hereby incorporated herein by reference.

TECHNICAL FIELD

The present application generally relates to an elastomeric body suitable for anti-vibration and suspension. In at least one embodiment, the elastomeric body comprises at least one layer of an elastic fire retardant coating. The present application also generally relates to a vehicle, a vessel and/or a stationery machinery comprising the elastomeric body.

BACKGROUND ART

The use of elastomeric products in various suspension and anti-vibration applications is common and well known in the art.

One kind of commonly used suspension products are elastomeric springs. Elastomeric springs are generally used to achieve the best possible ride comfort in various kinds of vehicles. The elastomeric spring generally consists of an elastomeric body shaped in order to exhibit the desired damping characteristics.

One other kind of commonly used suspension products are diaphragms. The diaphragm is a bag or bellow filled with air. The shape and size of the air bellow can be different in order to adapt the damping characteristics. Also the pressure in the air bellow can be changed in order to change the damping characteristics.

One example of common anti-vibration products is anti-vibration mounts. The anti-vibration mounts generally consist of rigid plates or brackets with an elastomeric body placed in between. One of the rigid plates or brackets is then generally fastened to the vibration source, e.g. an engine, and the other, to the environment that shall be isolated from the vibrations, e.g. a vehicle or a vessel.

One problem associated with the above-mentioned suspension and anti-vibration products is the unfavourable burning characteristics. The elastomeric body of the products is generally manufactured from synthetic polyisoprene and natural polyisoprene comprising reinforcement substances. The synthetic and natural polyisoprene is flammable as well as several of the reinforcement substances, e.g. carbon black, mineral oil or other organic chemicals. This results in an elastic body that provides no inherent resistance to fire.

Elastomeric bodies of isoprene compounds are relatively easy to ignite and lead to rapid and hot fires. The fire can even consume small sections of the elastomeric body. During the fire heavy sooty black smoke is emitted in large quantities. This is a problem especially in applications where a fire or smoke emission can cause serious damage to people and/or equipment. When the products are used in confined compartments, like subways and machine rooms of naval vessels, smoke emissions and heat release is a serious problem, shortening the time that can be effectively used for an evacuation.

It is known to modify isoprene and natural rubber elastomeric products with halogenated flame-retardants. This approach does however improve the flame retardant characteristics of the product in question, but does also have several drawbacks. The halogenated flame retardant does for example increase the toxicity of the product. Many halogenated flame retardants have also been banned from use, due to environmental reasons.

Another known approach is to modify isoprene and natural rubber elastomeric products with non-halogenated flame-retardants. In this case it is common to use aluminium trihydride and magnesium hydroxide to improve the fire retardant characteristics. These substances must however be compounded into the elastomeric material with a high percentage, exceeding 50% of weight, to become efficient. By incorporating a flame retardant material to such an extent, the elastomeric material will start losing its key characteristics such as compression set, dynamic modulus and creep.

Yet another approach when trying to avoid risks related to fire of elastomeric products is to simply manufacture the elastomeric products in another material. One possible solution is to use a halogenated polymer in order to create a product with improved fire retardant characteristics. However, also in this case, the material will become toxic and less favourable. It is also possible to use non-halogenated polymers, e.g. silicone. These polymers are however more expensive and suffer from low physical strength.

In order to be able to use standard elastomeric products it has been proposed to coat the products with standard intumescent coatings such as those used in the construction industry. These coatings are however unsuitable for elastomeric products, due to the fact that they are not sufficiently elastic to remain on an elastomeric product, when the product is subjected to frequent and continuous surface elongation.

SUMMARY

It is an object of at least one embodiment of the present invention to provide an improvement of the above prior art.

In at least one embodiment, an elastomeric body is provided, suitable for anti-vibration and suspension, comprising at least one layer of an elastic fire retardant coating.

At least one embodiment is directed to an elastomeric body, comprising at least one layer of an elastic fire retardant coating, a vehicle, a vessel and a stationary machinery comprising an elastomeric body that comprises at least one layer of an elastic fire retardant coating. Preferred embodiments are defined in the dependent claims.

Hence, an elastomeric body suitable for anti-vibration and suspension is provided in at least one embodiment. The elastomeric body comprises at least one layer of an elastic and flexible fire retardant coating. The elastic and flexible fire retardant coating covers at least a portion of the body. The at least one layer of fire retardant coating is non-halogenated and comprises a fire retardant substance and an elastic binder material. The fire retardant substance comprises expandable graphite. The coating has an elasticity greater than 20%.

The inventive elastomeric body of at least one embodiment is advantageous in that it is provided with at least one layer of an elastic fire retardant coating, making the body fire retardant while maintaining its elastic characteristics.

The elastomeric body may comprise a first layer applied on and covering at least a portion of the elastomeric body, and a second layer applied on top of and covering at least a portion of the first layer. This is advantageous in that the characteristics of the layers can be tuned in order to optimise the adhesion and fire retardant characteristics.

The first layer of fire retardant coating may have a greater elasticity than the second layer of fire retardant coating, which is advantageous in that the fire retardant coating can withstand surface elongation of the elastomeric body better.

The first layer of fire retardant coating may comprise a first fire retardant substance and the second layer may comprise a second fire retardant substance. This means that it is possible to optimise the fire retardant properties of the fire retardant coating and at the same time adapt the coating for the application where it should be used.

The first layer may comprise a first elastic binder material and the second layer may comprise a second elastic binder material. This means that it is possible to optimise the adhesion and durability of the fire retardant coating.

The first layer and the second layer of fire retardant coating may comprise a first fire retardant substance, which is advantageous in that the fire retardant characteristics and elasticity of the two layers can be adapted.

The first layer and the second layer of fire retardant coating may comprise a first binder material, which is advantageous in that the adhesion between the two layers becomes strong.

The at least one layer of fire retardant coating may comprise a third layer applied on top of and covering at least a portion of the second layer. This means that it is possible to adapt the surface properties of the layers covering the elastomeric body.

The third layer of fire retardant coating may be reflective to infrared radiation, which is advantageous in that the elastomeric body becomes less sensitive to radiant heat sources.

The fire retardant substance of at least one of the at least one layer of fire retardant coating may be expandable graphite. This is advantageous in that an effective elastic fire retardant coating can be achieved at a reasonable price without increasing the emissions if toxic gases.

The fire retardant substance of at least one of the at least one layer of fire retardant coating may be nitrogen-phosphorous based. This means that an effective and highly elastic fire retardant coating can be achieved.

The fire retardant substance of the at least one layer of fire retardant coating may include at least one material chosen from the group consisting of zinc borate, aluminium trihydrate, expandable graphite, ammonium polyphosphate, magnesium hydroxide, montmorillonite clay and red phosphorus. This means that it is possible to adapt the fire retardant characteristics of the coating to make it suit the application where it is used.

The binder material of the at least one layer of fire retardant coating may be an elastomeric polyurethane. This is advantageous in that a highly flexible fire retardant coating with a long life time can be achieved.

The binder material of the at least one layer of fire retardant coating may include at least one material chosen from the group consisting of natural rubber, ethylene acrylic rubber, epoxidised natural rubber, styrene butadiene, elastomeric polyurethane, ethylene propylene diene modified rubber, acrylonitrile butadiene, hydrogenated acrylonitrile butadiene rubber. This means that it is possible to adapt the elastic behaviour and characteristics of the fire retardant coating.

The at least one layer of fire retardant coating may be non-halogenated, which is advantageous in that the coating is non-poisonous and has little or no impact on the environment.

The elastomeric body may be made of a thermosetting elastomer, which is advantageous in that a durable long-lived elastomeric body can be achieved at a reasonable price.

The elastomeric body may be made of natural or synthetic polyisoprene, meaning that an elastomeric body with characteristics suitable for suspension and anti-vibration can be achieved.

The elastomeric body may include at least one material chosen from the group consisting of polyisoprene, natural rubber, ethylene acrylic rubber, styrene butadiene, elastomeric polyurethane, ethylene propylene diene modified rubber, acrylonitrile butadiene, polychloroprene, hydrogenated acrylonitrile butadiene rubber, epoxidised natural rubber. This means that it is possible to adapt the characteristics of the elastomeric body to make it suit the application, where it is used.

The elastomeric body can advantageously be used in suspension components and anti-vibration components, particularly where fire, smoke and toxicity is of concern.

The elastomeric body can advantageously be used in vehicles, vessels or stationary machinery, and in particular in rail vehicles and marine vessels.

BRIEF DESCRIPTION OF THE DRAWINGS

The invention will in the following be described by way of example based on different embodiments and with reference to the accompanying schematic drawings, in which.

DESCRIPTION OF EXAMPLE EMBODIMENTS

Figure 1A:
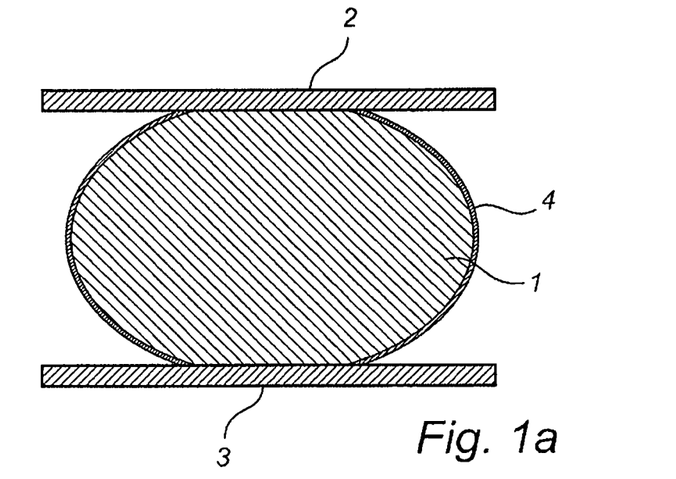
FIG. 1a is a cross sectional view of an elastomeric body with one layer of an elastic and fire retardant coating.

An elastomeric body according to a first embodiment is shown in FIG. 1a. The elastomeric body 1 is moulded from rubber. The elastomeric body is attached to two metal plates 2, 3, during the vulcanisation process by the use of proprietary bonding adhesives. The metal plates 2, 3 are used to fasten the elastomeric body to the surroundings, when used in any kind of application. One metal plate 2 is then fastened to, for instance, the carriage body of a railway vehicle and the other metal plate 3 to, for instance, a bogie of the railway vehicle. Further the elastomeric body is covered with one layer of an elastomeric fire retardant coating 4. The thickness of the layer is 80 μm. The elastomeric fire retardant coating 4 includes a fire retardant substance in the form of expandable graphite. Further, the elastomeric fire retardant coating 4 includes a binder material in the form of polyurethane. The expandable graphite constitutes 40% of the coating. The rest of the elastomeric fire retardant coating 4 is constituted by the polyurethane, i.e. 60%. The coating 4 has an elasticity over 100%. Further, the coating 4 is non-halogenated.

When applying the coating 4 to the elastomeric body 1, the fire retardant substance and the binder material are mixed into a solution using an organic solvent. The solution is then applied onto the elastomeric body 1, using a spray gun or any other suitable device, to form the fire retardant coating 4. This means that it is possible to either apply the coating 4 in situ, when the elastomeric body 1 is mounted in any kind of application, or before when the elastomeric body is fabricated. The organic solvent evaporates during the curing of the coating 4, leaving only fire retardant substance and the binder material in the coating 4.

Figure 1B:
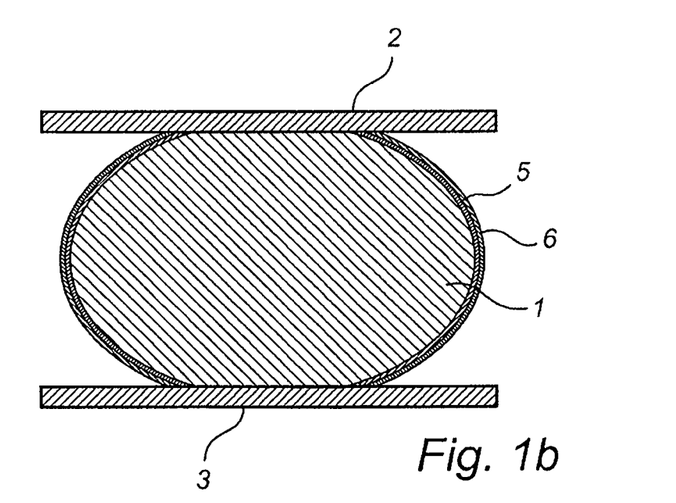
FIG. 1b is a cross sectional view of an elastomeric body with two layers of elastic and fire retardant coatings.

An elastomeric body according to a second embodiment is shown in FIG. 1*b*. Also in this embodiment, the elastomeric body 1 is moulded from rubber and attached to two metal plates 2, 3. The metal plates 2, 3, are also in this embodiment used to fasten the elastomeric body 1.

The elastomeric body 1 is covered by a first layer 5 of an elastomeric fire retardant coating. The first layer 5 is then covered by a second layer 6 of an elastomeric fire retardant coating.

The first layer 5 includes a nitrogen-phosphorous based fire retardant substance, and a binder material in the form of polyurethane. The nitrogen phosphorous based fire retardant substance constitutes 50% of the coating. The rest of the first layer 5 of the elastomeric fire retardant coating is constituted by the polyurethane, i.e. 50%. The thickness of the first layer 5 is 70 μm. The first layer 5 has an elasticity over 200%.

The second layer 6 of elastomeric fire retardant coating includes a fire retardant substance in the form of expandable graphite, and a binder material in the form of polyurethane. The expandable graphite constitutes 40% of the coating. The rest of the elastomeric fire retardant coating 4 is constituted by the polyurethane, i.e. 60%. The thickness of the second layer 6 is 80 μm. The second layer 6 has an elasticity over 100%.

Further, the first 5 and second 6 layers are non-halogenated.

When applying the first 5 and the second layer 6 of the coating to the elastomeric body 1, the fire retardant substance and the binder material of each layer 5, 6 are mixed into a solution using an organic solvent. Each solution is then applied onto the elastomeric body 1, using a spray gun or any other suitable device, to form the first layer 5 and the second layer 6 of fire retardant coating. The organic solvent evaporates during the curing of the first 5 and second 6 layers, leaving only fire retardant substances and the binder materials in the first 5 and second 6 layers of the fire retardant coating. The first layer 5 is first applied and left to cure, before the second layer 6 is applied on top of the first layer 5.

Figure 2:
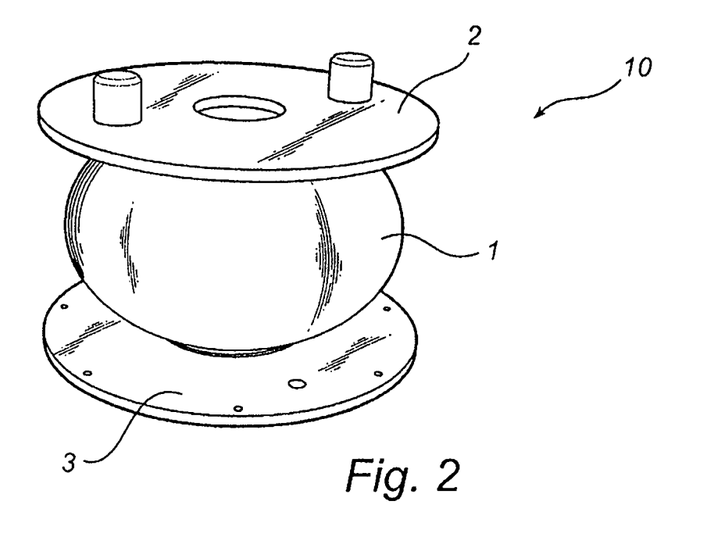
FIG. 2 is a perspective view of a suspension product in the form of an elastomeric spring.

A suspension product in the form of an elastomeric spring 10 is shown in FIG. 2. The elastomeric spring comprises an elastomeric body 1 and two metal plates 2, 3. As earlier described, the metal plates 2, 3 are used to fasten the elastomeric body 1 to the surroundings. The elastomeric body 1 is covered by an elastomeric fire retardant coating, not shown.

Figure 3:
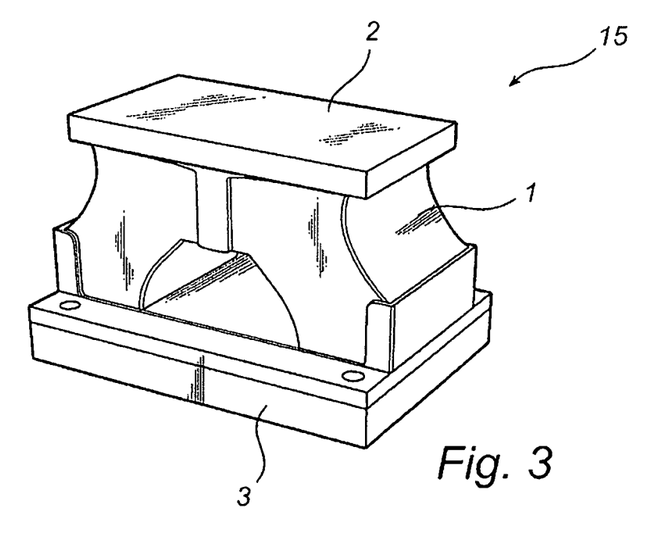
FIG. 3 is a perspective view of a anti vibration product in the form of an vibration mount.

Now referring to FIG. 3, a suspension product in the form of an anti-vibration mount 15 is shown. The anti-vibration mount has two metal plates 2, 3. The first metal plate 2 is fastened to a vibration source. The vibration source can, for instance, be an engine of a naval vessel or a road vehicle. The second metal plate 3, is used to fasten the anti-vibration mount to the surroundings, for instance, to the floor of an engine room on a naval vessel or to a support member of an engine compartment of a vehicle. The anti-vibration mount has an elastomeric body 1, which is covered by an elastomeric fire retardant coating, not shown.

Figure 4:
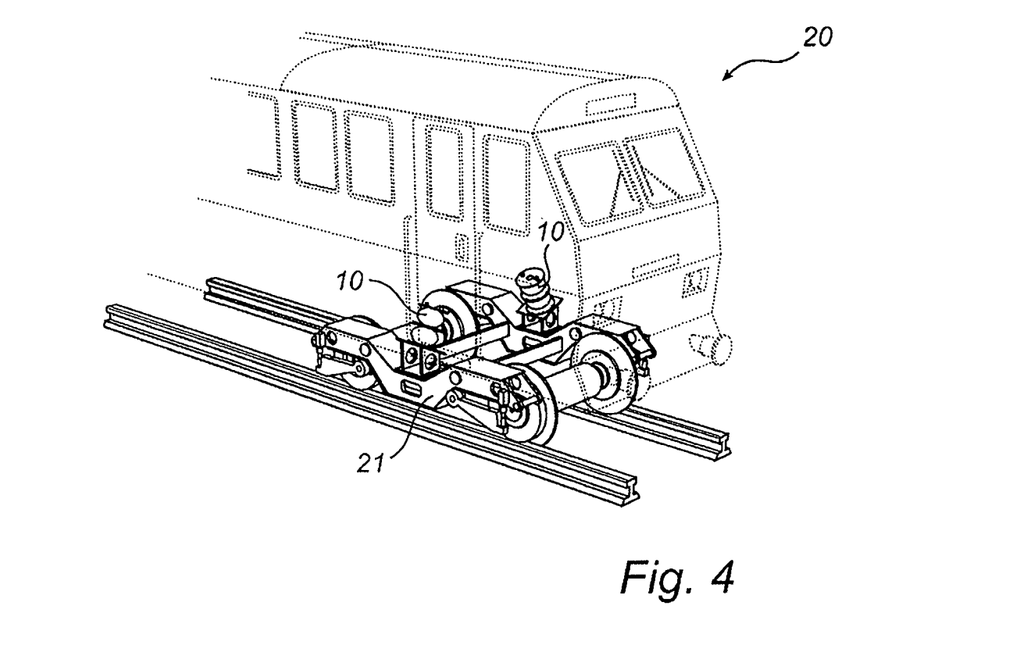
FIG. 4 is a perspective view of a train having a bogie including elastomeric springs.

FIG. 4 shows a train unit 20 having a bogie 21. The bogie is provided with a suspension system including elastomeric springs 10. The springs 10 are used to damp out vibrations of the bogie 21, increasing the ride comfort of the train unit 20. A general solution is to use the elastomeric spring 10 in combination with an air diaphragm. In this case, the elastomeric spring damps out low frequency movements typically having a large amplitude and the air spring damps out high frequency movements typically having a small amplitude. Needless to say, in this case both the elastomeric spring and the diaphragm are covered by the fire retardant coating.

Figure 5:
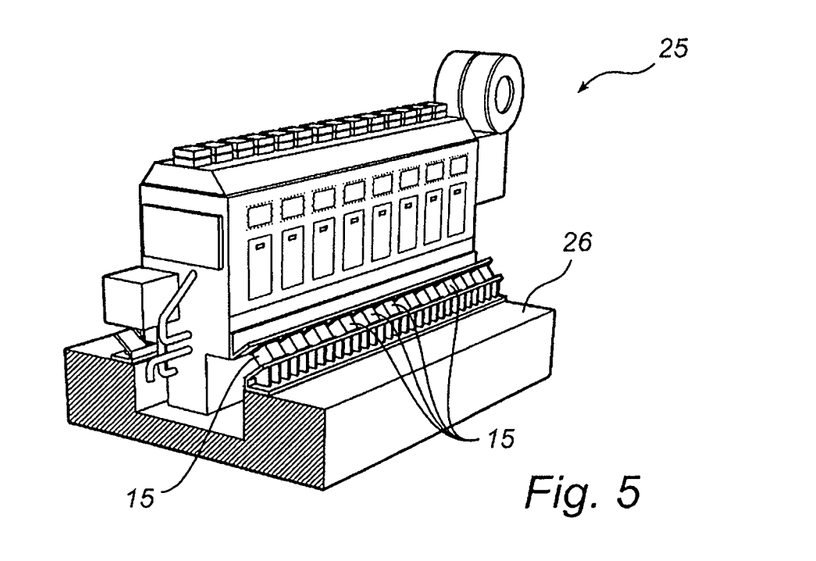
FIG. 5 is a perspective view of a naval engine mounted on anti vibration mounts.

FIG. 5 shows a naval engine 25, mounted on a number of anti-vibration mounts 15. The entire weight of the naval engine is carried by the anti-vibration mounts 15. This implies that the vibrations generated by the engine 25 will not be transmitted to the surroundings 26, i.e. the floor of the naval vessel's engine room.

Figure 6:
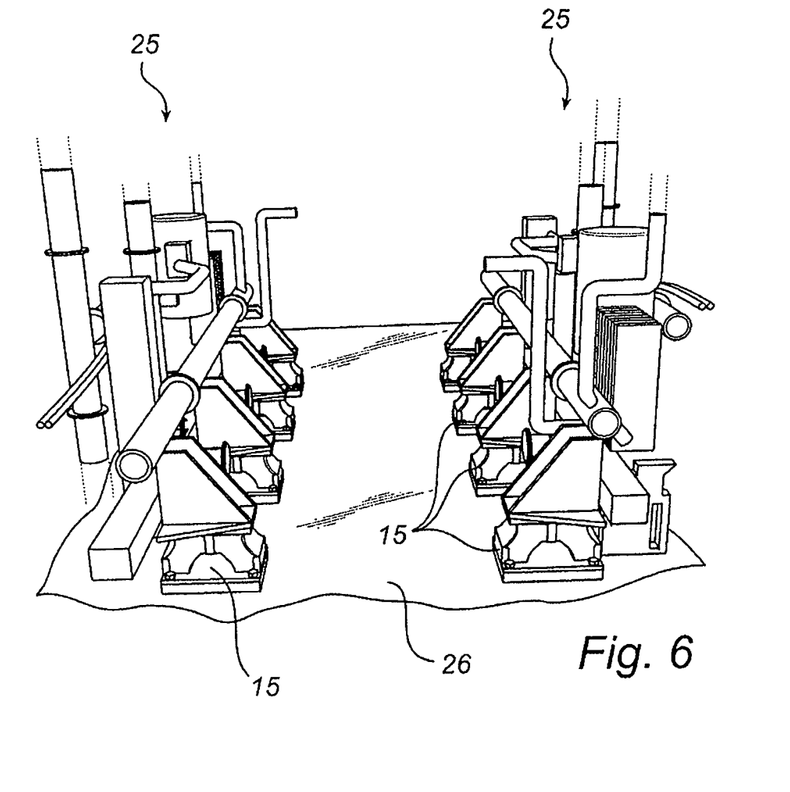
FIG. 6 is a partial view of two naval engines mounted on anti vibration mounts.

Now referring to FIG. 6, two naval engines are partly shown. Both engines 25 are mounted on anti vibration mounts 15. The anti-vibration mounts are secured to the floor 26 of the engine room of the naval vessel and to the naval engines 25.

A person skilled in the art will realise that a large number of modifications of the here described embodiments of the invention are conceivable within the scope of the invention, which is defined in the appended claims.

For example, the thickness of the fire retardant coating 4, in the single layer case, can be varied depending on the needs. The thickness of the fire retardant coating is preferably in the range of 10-500 μm, more preferably in the range of 50-110 μm and most preferably about 80 μm.

For example, the thickness of the first 5 and second 6 layers of the fire retardant coating, in the dual layer case, can be varied depending on the needs. The thickness of the first layer 5 is preferably in the range of 10-500 μm, more preferably in the range of 40-100 μm and most preferably about 70 μm. The thickness of the second layer 6 is preferably in the range of 10-500 μm, more preferably in the range of 50-110 μm and most preferably about 80 μm.

Also, the materials of the layers 4, 5, 6 in the single and dual layer case can be varied to suit the needs. It is, for example, possible to use different fire retardant substances as well as different binder materials.

For instance, zinc borate, aluminium trihydrate, expandable graphite, ammonium polyphosphate, magnesium hydroxide, montmorillonite clay and red phosphorus, can be used as fire retardant substance in the fire retardant coating 4, 5, 6.

For instance, natural rubber, ethylene acrylic rubber, epoxidised natural rubber, styrene butadiene (SBR), elastomeric polyurethane, ethylene propylene diene modified rubber (EPDM), acrylonitrile butadiene (NBR) and hydrogenated acrylonitrile butadiene rubber (HNBR), can advantageously be used as binder material in the fire retardant coating 4, 5, 6.

It is, for example, possible to use any combination of the above-mentioned fire retardant substances and binder materials. It is also possible to mix the substances and materials to achieve different properties. In other words, different fire retardant substances and mixtures of substances can be used in different layers 4, 5, 6 and different binder materials and mixtures of materials can be used in different layers 4, 5, 6.

Also, the material of the elastomeric body 1 can be altered. For instance, natural polyisoprene, synthetic polyisoprene, natural rubber, synthetic rubber, ethylene acrylic rubber, styrene butadiene (SBR), elastomeric polyurethane, ethylene propylene diene modified rubber (EPDM), acrylonitrile butadiene (NBR), polychloroprene (CR), hydrogenated acrylonitrile butadiene rubber (HNBR) and epoxidised natural rubber, can advantageously be used in the body 1. It is also possible to mix various materials in order to achieve a suitable composition for the elastomeric body 1.

Also, the number of layers 4, 5, 6 can be altered. It is, for example, possible to use a three layer system. In this case the dual layer system described above can advantageously be used as the two first layers 5, 6. A third layer can then be applied on top of the second layer 6. The third layer can for instance comprise a nitrogen-phosphorous based fire retardant substance with a concentration of 10-40%. Also, in this case an elastomeric polyurethane can be used as a binder material. The concentration can advantageously be in the range of 50-70%. By adding a pigment, for instance, with a concentration within the range of 1-20%, the fire retardant coating 4, 5, 6 can be made more reflective to infrared radiation, and thus less sensitive to radiant heat sources. If the above described composition is used in the third layer, the third layer will have an elasticity over 200%. A typical thickness for the third layer is about 50 µm. All the above-mentioned values mentioned regarding the third layer can of course be altered in order to suit the application in question.

Also, the metal plates 2, 3 can be used from any other suitable rigid or flexible material such as, composite, plastics etc. The metal plates 2, 3 can also be omitted, meaning that the elastomeric body 1 can be fastened directly to the surroundings or not fastened at all.

In the above description the elastomeric body is a solid body of elastomeric material, but the elastomeric body can also be, for example, a diaphragm, a hollow body, a body consisting of several elastomeric materials, a body consisting of several parts etc.

Experiments proving the efficiency of the fire retardant coating have been carried out. During the experiments, coated and uncoated rubber has been exposed to a radiant heat source in a cone calorimeter. This is a standard procedure promoted by ISO 5660 part 1 and ISO 5660 part 2.

During the experiments, the sample that is to be tested is subjected to a uniform heat radiance. The heat radiance is produced by a conical electrical heater placed in proximity to the sample. Typically the heat release from the heater is in the range of 10-100 kW/m$^2$. The experiments are typically carried out under well ventilated conditions, and samples of various gases are taken above the sample, in an instrumented hood. It is however also possible to test samples under oxygen depleted conditions. A spark is used to ignite flammable gases emitted from the test sample during the experiments.

The cone calorimeter measures heat release on the basis of oxygen consumption calorimetry. This is based on the fact that the heat output from many combustible materials including most natural and synthetic plastics, rubbers and textiles is almost always a constant 13.6 kJ per gram of oxygen consumed. Other gas measurements, such as carbon monoxide and carbon dioxide concentrations are made, together with measurement of smoke density.

During the experiment, output data are recorded for mass loss, oxygen concentration, carbon monoxide concentration, carbon dioxide concentration, smoke density and fire effluent flow as functions of time. The raw data is processed and heat release rates and effective heats of combustion are calculated together with averaged data calculated by oxygen consumption calorimetry. Fire gas and smoke yields per gram of sample burnt are also calculated.

FIG. 7-12 are diagrams showing different measurements and calculated values during an experiment where a 100 mm×100 mm×6 mm thick standard rubber, i.e. uncoated rubber, and coated rubber were subjected to a radiant heat of 35 kW/m$^2$ in the cone calorimeter described above. The coated rubber is coated with a coating according to the single layer embodiment described above.

Figure 7:
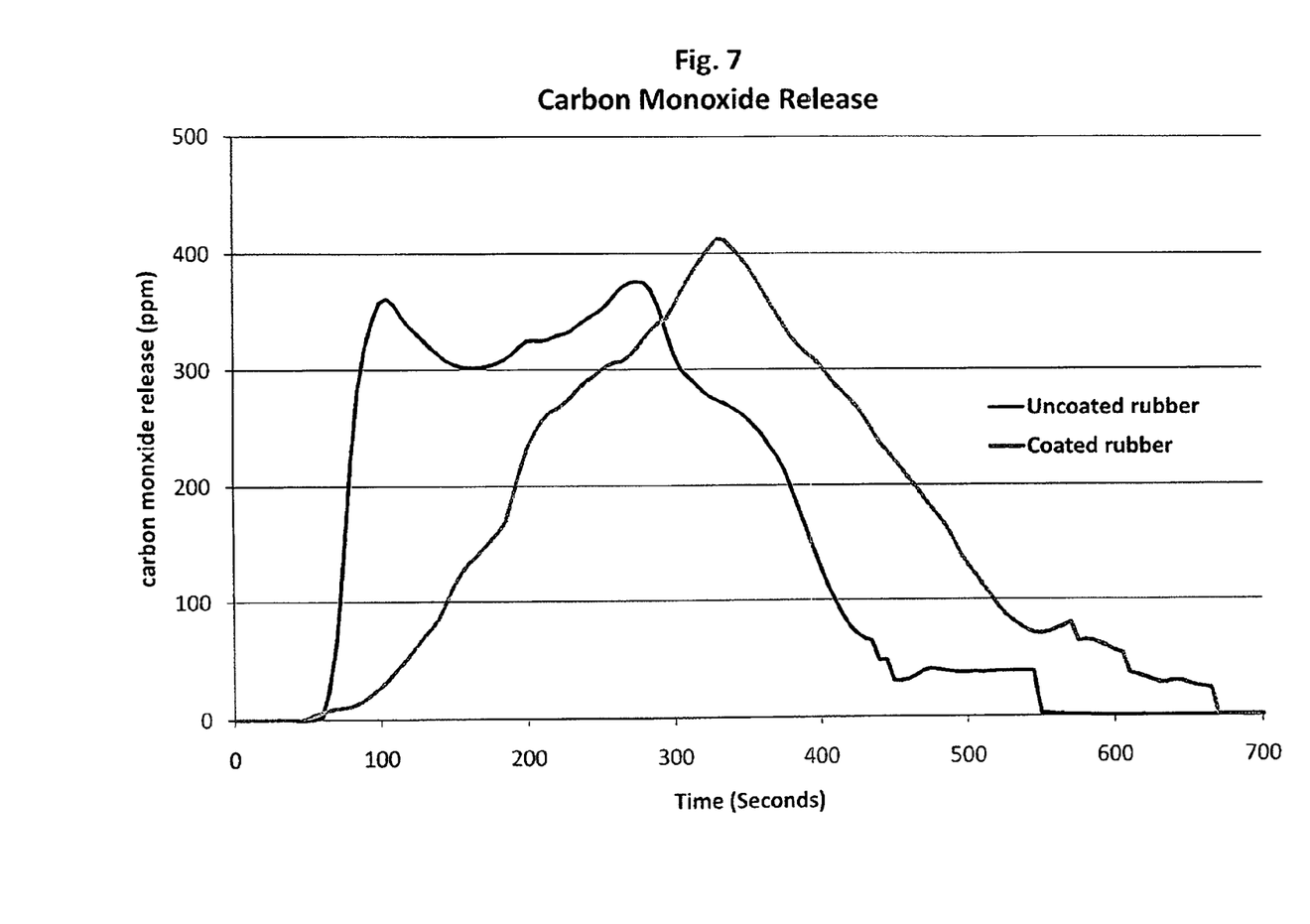
FIG. 7 is a schematic diagram showing carbon monoxide release during an experiment.

FIG. 7 shows carbon monoxide release versus time. As is evident from the diagram, the carbon monoxide release during the first four minutes is lower for the coated rubber than for the uncoated rubber.

Figure 8:
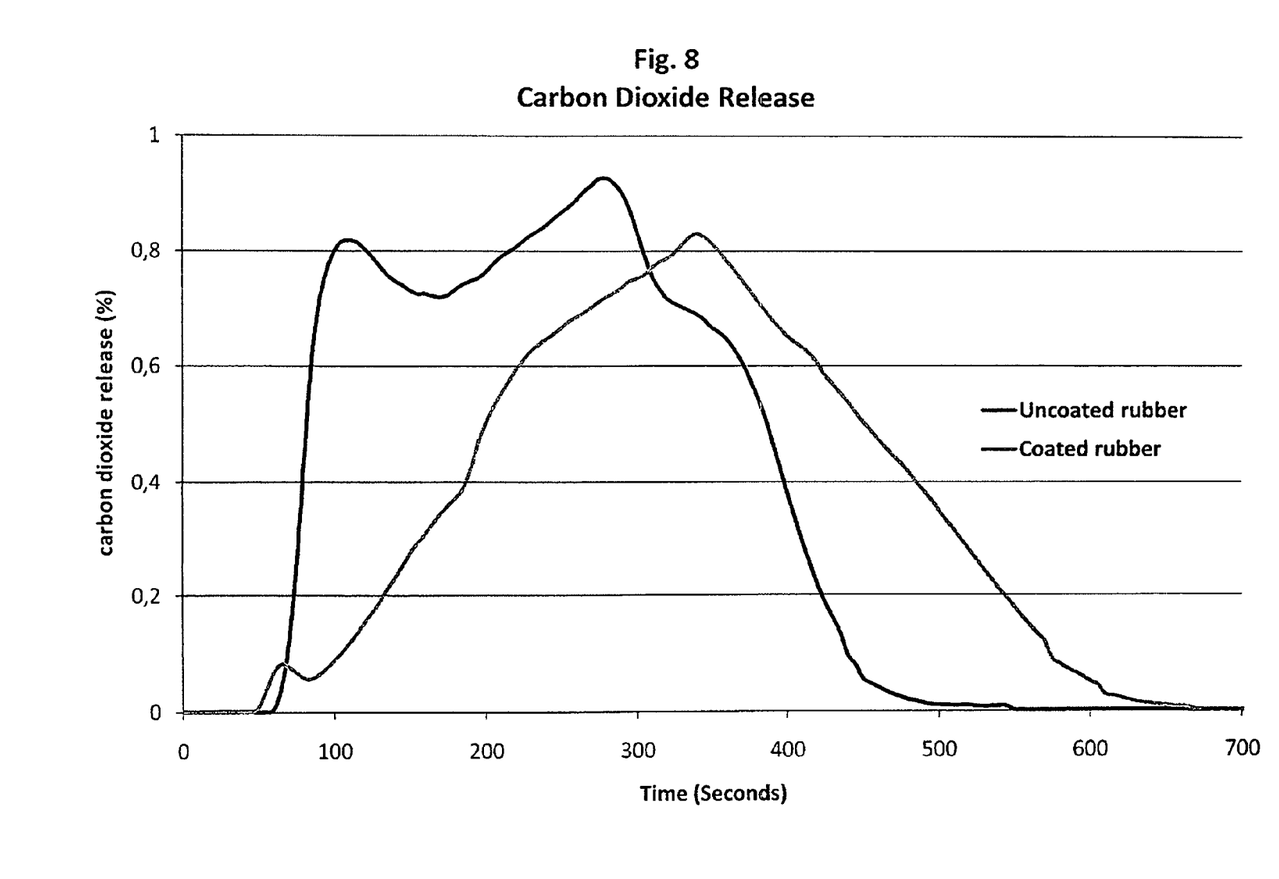
FIG. 8 is a schematic diagram showing carbon dioxide release during an experiment.

FIG. 8 shows carbon dioxide release versus time. The carbon dioxide release is lower for the coated rubber during the first five minutes, than for the uncoated rubber.

Figure 9:
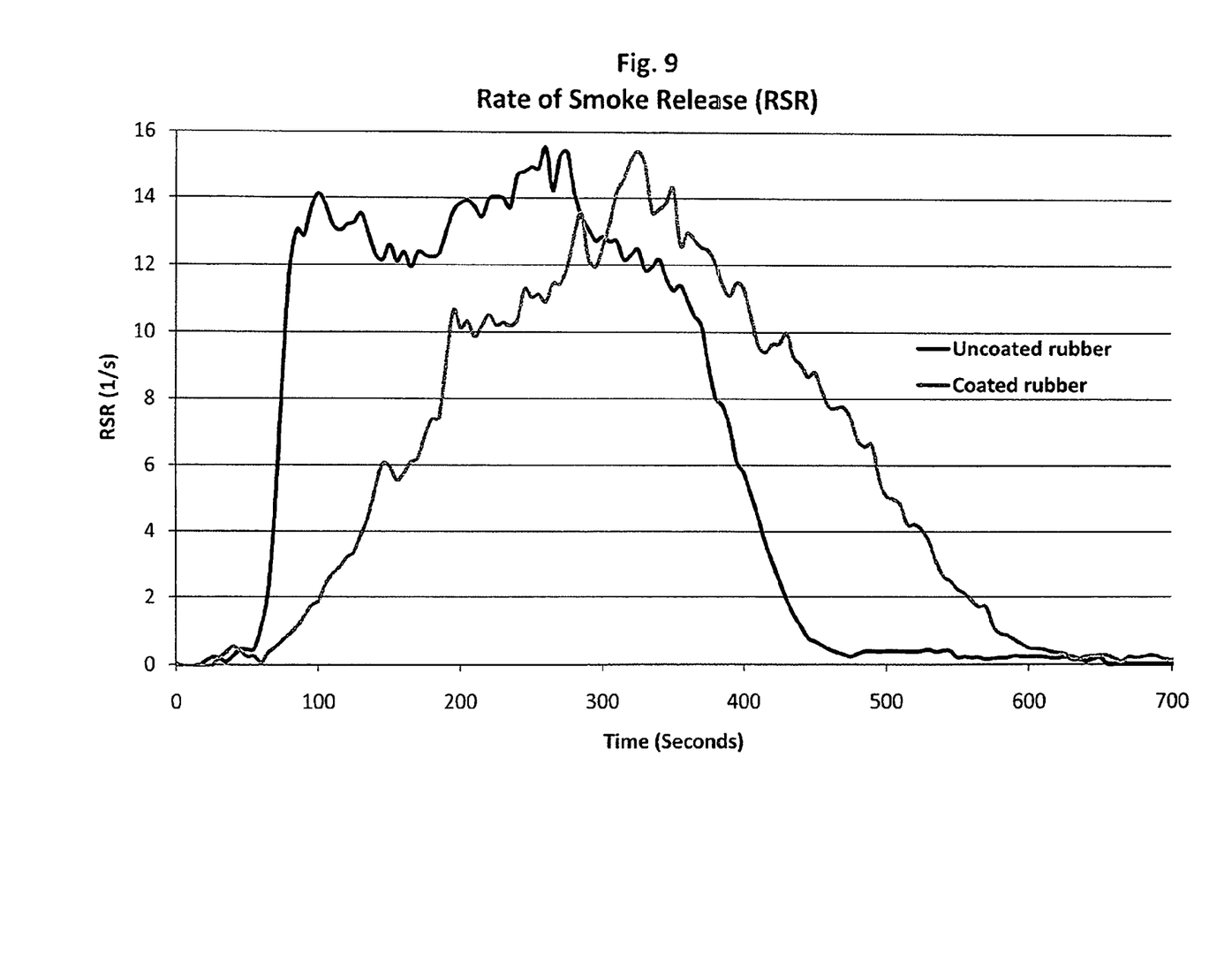
FIG. 9 is a schematic diagram showing smoke release during an experiment.

FIG. 9 shows the rate of smoke release (RSR) versus time. As is evident from the diagram, the smoke release during the first four minutes is lower for the coated rubber than for the uncoated rubber.

Figure 10:
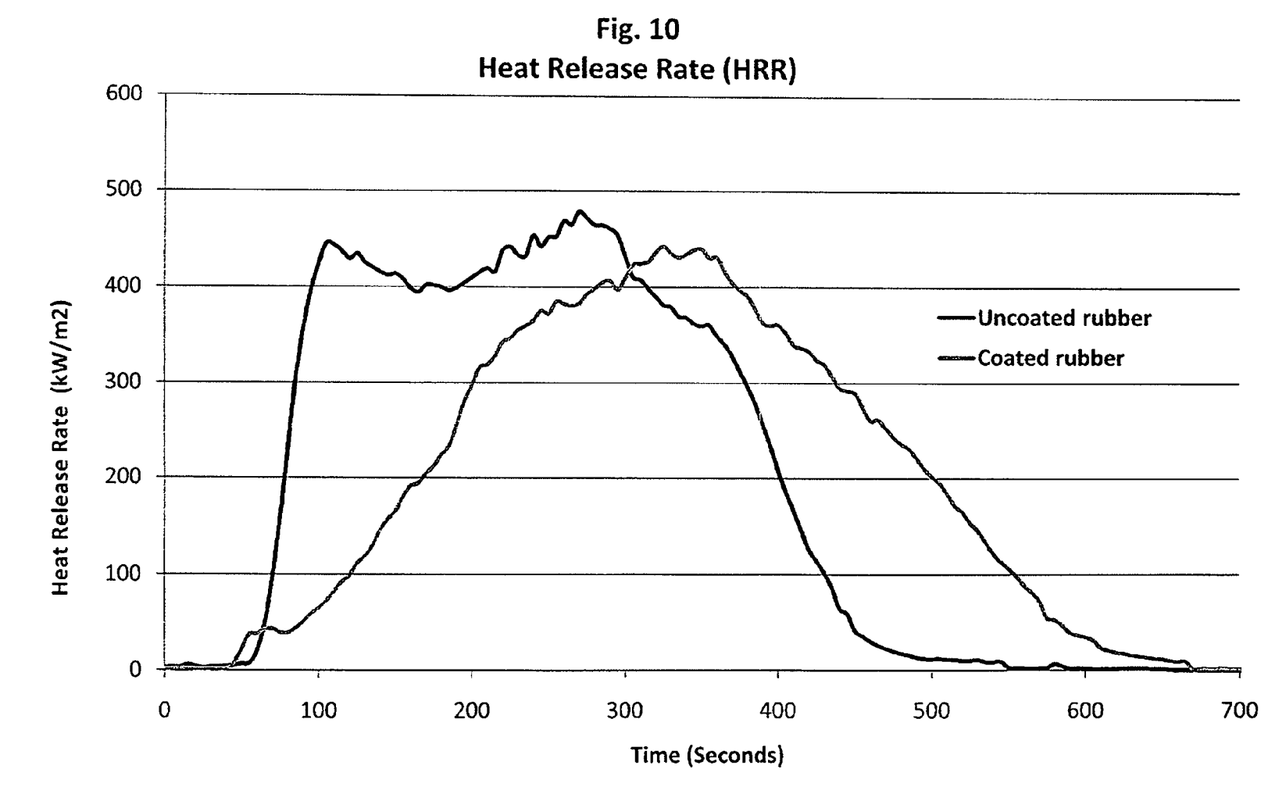
FIG. 10 is a schematic diagram showing a comparison of heat release rate during an experiment.

FIG. 10 shows a comparison of heat release rate (HRR) between uncoated and coated rubber. The diagram does clearly indicate that heat release is lower for the coated rubber than for the uncoated rubber, during the first five minutes.

Figure 11:
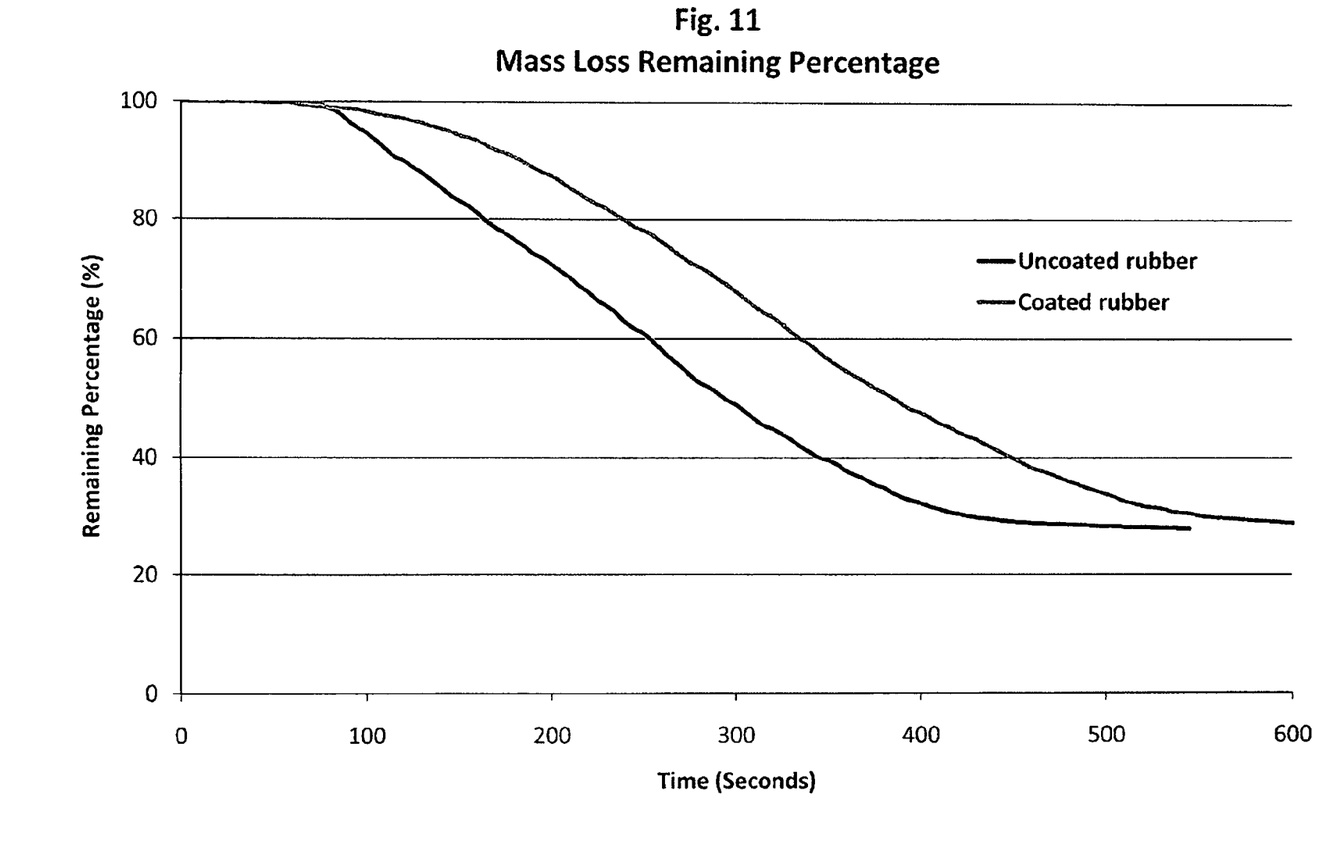
FIG. 11 is a schematic diagram showing the remaining percentage mass loss during an experiment.

FIG. 11 shows the mass loss remaining percentage versus time. As can be seen in the diagram, the remaining mass of the sample is higher for the coated rubber than for the uncoated rubber during the period of burning.

Figure 12:
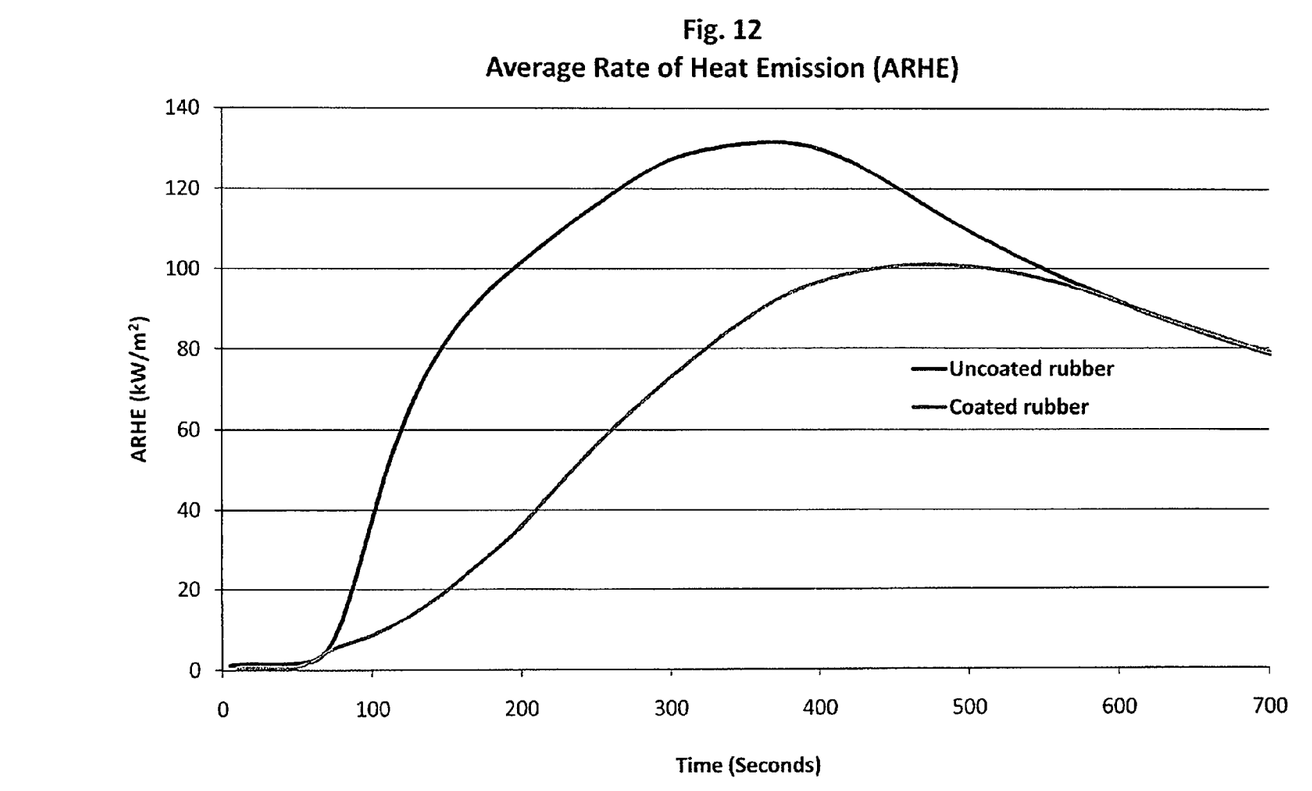
FIG. 12 is a schematic diagram showing the average rate of heat emission during an experiment.

FIG. 12 shows the average rate of heat emission (ARHE) versus time. As is clear from the diagram, the average rate of heat emission is lower for the coated rubber, than for the uncoated rubber throughout the experiment.

A general observation is that all the gas emissions, the smoke emission and heat releases shown in FIG. 7-12 is delayed for the coated rubber. When summing up all these advantageous delays of different emissions, it can easily be understood that the fire retardant coating 4, 5, 6 is efficient and does delay fire spread. It can also be understood that the fire retardant coating 4, 5, 6 can prevent a fire from starting at all. Also, the mass loss of the coated rubber is reduced during the experiment presented above.

A summary of the differences between the coated and uncoated rubber can be found in table 1 below. Testing was carried out on a Cone Calorimeter in accordance with ISO 5660 parts 1 and 2, at an imposed heat flux of 35 kW/m$^2$.

TABLE 1

| Test | Units | Uncoated rubber | Coated rubber |
| --- | --- | --- | --- |
| Time to Ignition | seconds | 67 | 49 |
| Time to Flameout | seconds | 474 | 593 |
| Total Heat Evolved | MJ/m$^2$ | 137 | 136 |
| Average Heat Release Rate | KW/m$^2$ | 341 | 251 |

TABLE 1-continued

| Test | Units | Uncoated rubber | Coated rubber |
|---|---|---|---|
| Peak Heat Release Rate (PHRR) | KW/m$^2$ | 491 | 481 |
| Time at Peak Heat Release | seconds | 170 | 349 |
| Maximum Average rate of Heat Emission (MARHE) | KW/m$^2$ | 132 | 102 |

When elastomeric bodies 1 are used in confined spaces, a delay of fire spread can be very important in terms of evacuation of people. For instance, if a train unit 20 is subjected to fire within a tunnel, more time will be available for an evacuation of the passengers, before the air gets too toxic and the visibility becomes too low. Even if a fire is only delayed for a couple of minutes, several lives can be saved in practice.

The same situation occurs when a fire starts in an engine room of a naval vessel, meaning that the possibility to delay a fire is very important also in this case.

Coated and uncoated rubber has also been tested for limiting oxygen index. In this case, both the single layer embodiment and the dual layer embodiment according to above, have been tested according to ISO 4589-2-Oxygen Index Test. The results of these tests are presented in table 2 below.

TABLE 2

| Test | Units | Uncoated rubber | Coated rubber Single coat | Coated rubber Dual coat |
|---|---|---|---|---|
| Limiting Oxygen Index | % Oxygen | 20 | 35 | 35 |

As can be seen from the figures presented in table 2, the coated rubber exhibits a higher limiting oxygen index, meaning that more oxygen is needed to maintain an ongoing fire. This means in practice that the coated rubber, single and dual layer, is more fire resistant than uncoated rubber.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed:

1. An elastomeric body suitable for anti-vibration and suspension, comprising:
    at least one layer of an elastic and flexible fire retardant coating covering at least a portion of said elastomeric body,
        wherein said at least one layer of fire retardant coating is non-halogenated and comprises a fire retardant substance and an elastic binder material,
        wherein said fire retardant substance is expandable graphite, and wherein said at least one layer of coating has an elasticity greater than 20%,
    wherein the binder material is elastomeric polyurethane, and
    wherein the at least one layer of the elastic and fire retardant coating has a thickness between 10 µm-500 µm.

2. An elastomeric body according to claim 1, wherein said fire retardant substance of at least one of said at least one layer of fire retardant coating is nitrogen-phosphorous based.

3. An elastomeric body according to claim 1, wherein said elastomeric body is made of a thermosetting elastomer.

4. An elastomeric body according to claim 1, wherein said elastomeric body includes at least one material chosen from the group consisting of polyisoprene, natural rubber, synthetic rubber, ethylene acrylic rubber, styrene butadiene, elastomeric polyurethane, ethylene propylene diene modified rubber, acrylonitrile butadiene, polychloroprene, hydrogenated acrylonitrile butadiene rubber and epoxidised natural rubber.

5. An elastomeric body according to claim 1, wherein said at least one layer of fire retardant coating is a single layer coating.

6. An elastomeric body according to claim 1, wherein said at least one layer of fire retardant coating comprises a first layer applied on and covering at least a portion of said elastomeric body, and a second layer applied on top of and covering at least a portion of said first layer.

7. An elastomeric body according to claim 6, wherein said first layer comprises a first fire retardant substance and said second layer comprises a second fire retardant substance.

8. An elastomeric body according to claim 6, wherein said first layer comprises a first elastic binder material and said second layer comprises a second elastic binder material.

9. An elastomeric body according to claim 6, wherein said first layer and said second layer comprises a first fire retardant substance.

10. An elastomeric body according to claim 6, wherein said first layer and said second layer comprise a first binder material.

11. An elastomeric body according to claim 6, wherein said first layer has a relatively greater elasticity than said second layer.

12. An elastomeric body according to claim 11, wherein said first layer comprises a first fire retardant substance and said second layer comprises a second fire retardant substance.

13. An elastomeric body according to claim 6, wherein said at least one layer of fire retardant coating comprises a third layer applied on top of and covering at least a portion of said second layer.

14. An elastomeric body according to claim 13, wherein said third layer is reflective to infrared radiation.

* * * * *